(12) United States Patent
Brenaut et al.

(10) Patent No.: US 12,174,012 B2
(45) Date of Patent: Dec. 24, 2024

(54) DEVICE FOR MEASURING A WIDTH OF A SLOT IN A PRODUCT

(71) Applicant: Bobst Lyon, Bron (FR)

(72) Inventors: Maxime Brenaut, Lyons (FR); Christian Légier, Lyons (FR); Michel Mouchon, Mions (FR); Alexandre Laurent, Taluyers (FR)

(73) Assignee: BOBST LYON, Bron (FR)

( * ) Notice: Subject to any disclaimer, the term of this patent is extended or adjusted under 35 U.S.C. 154(b) by 240 days.

(21) Appl. No.: 17/753,573

(22) PCT Filed: Sep. 9, 2020

(86) PCT No.: PCT/EP2020/075138
§ 371 (c)(1),
(2) Date: Mar. 8, 2022

(87) PCT Pub. No.: WO2021/048165
PCT Pub. Date: Mar. 18, 2021

(65) Prior Publication Data
US 2022/0333910 A1    Oct. 20, 2022

(30) Foreign Application Priority Data
Sep. 13, 2019    (EP) ..................................... 19306105

(51) Int. Cl.
*G01B 3/20*      (2006.01)
*G01B 3/38*      (2006.01)
*G01B 5/02*      (2006.01)

(52) U.S. Cl.
CPC .............. *G01B 3/205* (2013.01); *G01B 3/38* (2013.01); *G01B 5/02* (2013.01)

(58) Field of Classification Search
CPC . G01B 3/205; G01B 3/38; G01B 5/02; G01B 5/14; B31B 50/624; B31B 2100/0022; B31B 2120/302; B31B 50/006
See application file for complete search history.

(56) References Cited

U.S. PATENT DOCUMENTS 1,243,545 A * 10/1917 Nefedov ................... G01B 3/18
                                                                         33/802
4,345,380 A    8/1982   Vis
(Continued)

FOREIGN PATENT DOCUMENTS

FR            2994930 A      3/2014
GB           2561366 A     10/2018
(Continued)

OTHER PUBLICATIONS

International Search Report issued Nov. 18, 2020 in corresponding International Application PCT/EP2020/075138 (3 pages).

*Primary Examiner* — John Fitzgerald
*Assistant Examiner* — Tania Courson
(74) *Attorney, Agent, or Firm* — Bookoff McAndrews, PLLC (57) ABSTRACT

A measuring device for measuring a width (W) between a first edge (4) and a second edge (5) of spaced apart opposed edges (4, 5) of a slot (16) in a product (1'), comprising:
- a measuring part (18), with a measuring detector and a display (28), and provided with a first tab (37) configured to enter into the slot (16), and
- a slide (29), defining a longitudinal axis (X), being arranged so as to be adjustable relative to the measuring part (18) along the longitudinal axis (X), and provided with a second tab (46) being configured to enter into the slot (16).

The slide (29) is adjusted so that a first surface (44) of the first tab (37) contacts the first edge (4) and a second surface (49) of the second tab (46) contacts the second edge (5).

(Continued)

A distance (d) between the first surface (44) and the second surface (49) corresponding to the width (W) is detected by the measuring detector, and the value of the width (W) is displayed by the display (28).

The first and second tabs (37, 46) are oriented downwardly relative to the measuring part (18), perpendicular or transverse to the longitudinal axis (X) of the slide (29).

16 Claims, 3 Drawing Sheets

(56) References Cited

U.S. PATENT DOCUMENTS

| | | | | |
|---|---|---|---|---|
| 4,554,742 | A * | 11/1985 | Freitag | G01C 7/02 |
| | | | | 33/783 |
| 4,606,129 | A | 8/1986 | Barrowman et al. | |
| 4,947,555 | A | 8/1990 | Allen, III | |
| 5,067,250 | A * | 11/1991 | Auweiler | G01B 7/002 |
| | | | | 33/783 |
| 5,657,550 | A * | 8/1997 | Struble | G01B 5/14 |
| | | | | 33/544.4 |
| 6,770,081 | B1 | 8/2004 | Cooper | |
| 7,275,331 | B2 * | 10/2007 | Mills | G01B 7/001 |
| | | | | 33/783 |
| 7,347,002 | B2 * | 3/2008 | Foege | G01B 3/205 |
| | | | | 33/783 |
| 7,984,565 | B2 * | 7/2011 | Wu | G01B 5/02 |
| | | | | 33/679.1 |
| 8,286,362 | B2 * | 10/2012 | Petersheim | G01B 5/14 |
| | | | | 33/608 |
| 9,651,351 | B2 * | 5/2017 | Lambert | G01B 5/14 |
| 2010/0011901 | A1 | 1/2010 | Burbank | |
| 2010/0162583 | A1 | 7/2010 | Wu | |
| 2016/0113732 | A1 | 4/2016 | Steege | |

FOREIGN PATENT DOCUMENTS

| | | |
|---|---|---|
| JP | 2009542671 A | 12/2009 |
| JP | 2012504016 A | 2/2012 |
| JP | 2018534100 A | 11/2018 |
| JP | 2019501699 A | 1/2019 |
| JP | 2019034002 A | 3/2019 |

* cited by examiner

DEVICE FOR MEASURING A WIDTH OF A SLOT IN A PRODUCT

CROSS-REFERENCE TO RELATED APPLICATION(S)

This application is a National Stage Application under of 35 U.S.C. § 371 of International Application No. PCT/EP2020/075138, filed Sep. 9, 2020, which claims priority to European Application No. 19306105.8, filed on Sep. 13, 2019, the entireties of which are incorporated herein by reference.

The present invention concerns a device for measuring a width between spaced apart opposed edges of a slot in a product. The present invention also relates to a method for measuring a width between spaced apart opposed edges of a slot in a product.

BACKGROUND OF THE INVENTION

The product can in particular be a foldable box such as a packaging box made of cardboard and more specifically of corrugated cardboard. During manufacture of boxes, two opposite cardboard panels are glued to each other with the intermediate of a glue flap. Two slots extend transversely between the two adjacent cardboard panels of the folded box in a folded-glued state. The first slot extends from the longitudinal rear edge to the center of the folded box and the second slot extends from the center of the folded box to the longitudinal front edge, the slots being interrupted by the glue flap connecting the opposite panels.

In the prior art, a packaging machine for manufacturing boxes comprises a folding-gluing unit. During the folding-gluing operations of each cardboard blank, the two panels sometimes suffer from positional deviations, from the desired position of same, once they have been folded and glued, either due to a deviation of the movable elements of the unit, and/or due to an offsetting of all or part of the blank in relation to the machine during processing of same and/or due to a blank having geometric properties that are slightly different from the ideal model of the cardboard blank.

Assuming that the cardboard panels are glued to each other correctly, the slot has a constant dimension over the entire width. If the width is the same within certain tolerances and lies within a predefined range, then the quality is considered to be correct. It has however turned out that the cardboard portions sometimes are not perfectly square. Then, it is possible that the slot extends obliquely or along a curved path from one side of the folded box to the other. This kind of defect is called "squaring issue" as it is the result of the cardboard portions not being square. Dimensions of slots change over the width. This defect may be due to incorrect cutting, incorrect creasing, incorrect folding and/or incorrect gluing.

STATE OF THE ART

Today, optical installations to measure the width of slots with a good repeatability are installed in packaging machines. These installations are however very expensive, heavy, more often fixed at the level of the outlet of the packaging machines.

For punctual checking and measurements, operators of the packaging machine have to pick up a sample of folded box from time to time during the production to check the quality and to measure the dimensions of the folded box and more specifically the width of the slot. They usually use common tools such as a measuring tape or a standard caliper.

However such tools for checking and/or measuring the width are not specific and may lead to mistakes in positioning the device at the product level and/or in reading the value of the width. The precision of the measure with a measuring tape could not be better than 1 mm. The difficulty of using the standard caliper, is that the inside jaws are very thin and small. And thus, the result of measuring the width can be different depending on where the measure is taken at the level of the slot, leading to erroneousness for the value. This imprecision to take the measure is also accentuated by the fluctuation in the force that operator applies with his hands on the caliper on the edges of the slot on the folded cardboard box. The regularity of the measure depends on the operator's skills for avoiding distortion of the cardboard and to repeat precisely the same force at each measurement.

SUMMARY OF THE INVENTION

An aim of the present invention is to propose a device for measuring a width of a slot in a product. Another aim is to decrease the time for performing measurement with a device while keeping the measurement quality in term of accuracy and repeatability. Still another aim is for the operator to have a compact, portable, ergonomic and easy to use device. Still another aim is to provide a method for measuring a width between spaced apart opposed edges of a slot in a product with a device the product being a folded box made of cardboard.

According to a first aspect of the present invention, there is provided a measuring device for measuring a width between a first edge of spaced apart opposed edges and a second edge of the spaced apart opposed edges of a slot in a product, the measuring device comprises:
  a measuring part comprising a measuring detector and a display, and wherein the measuring part is provided with a first tab configured to enter into the slot, and
  a slide, defining a longitudinal axis and being arranged so as to be adjustable relative to the measuring part along the longitudinal axis, and the slide being provided with a second tab being configured to enter into the slot of the product,
  the slide being adjustable so that a first surface of the first tab contacts the first edge of the product and a second surface of the second tab contacts the second edge of the product, and wherein a distance between the first surface of the first tab and the second surface of the second tab corresponding to the width of the slot is detectable by the measuring detector, and the value of the width of the slot being displayed by the display,
  and wherein the first and second tabs have an extension such that they are oriented downwardly relative to the display of the measuring part, and perpendicular or transverse to the longitudinal axis of the slide.

In other words, the first and second tabs and corresponding first and second surfaces are oriented parallel to the respective edges of the slot and this orientation enables to take the measure on a larger area on the edges of the slot. Taking the measure on a large area allows to average the determined value and consolidates the measure. The first and second tabs of the measuring device are dedicated to measuring the width.

This device is small and ergonomic and can be used by machine operators without specific training. For instance in the packaging industry at each moment of the production of boxes, the operator can easily check the width of slot on a folded box produced by the machine.

According to an exemplary embodiment, the slide extends through a proximal aperture and a distal aperture in the measuring part, such to enable an adjustable movement of the measuring part relative to the slide along the longitudinal axis.

According to one embodiment, the measuring device comprises a biasing arrangement arranged between the slide and the measuring part. The biasing arrangement is configured to exert a force spreading the first tab from the second tab.

With the biasing arrangement, the first tab with the first surface and the second tab with the second surface are respectively placed into abutment against the first edge and second edge of the spaced apart opposed edges. The accuracy for measuring the width of the slot is increased. The force of the biasing arrangement may be selected in the range of 0.03 to 0.10 N/mm, preferably between 0.04 and 0.07 N/mm, and most preferably about 0.052 N/mm.

This force applied by the biasing arrangement corresponds to a value which allows a reproduction of the same measurement conditions for each measurement. Hence, the measurement conditions are reproduced by the biasing arrangement such that any variation due to how the operator uses the tool can be eliminated, such as for instance if the operator were to force the tabs apart himself without the use of a biasing arrangement.

However, the force needs to be adapted to the material of the folded box in order to prevent damage to the box, i.e. in a situation when the tabs are deforming the sides of the slot. As the present measuring device is used in a substantially horizontal configuration and supported on the surface of the box, the inventors have surprisingly found that a relatively small biasing force is needed in order to contact the sides of the slot and achieve reproducible measurements. At the same time, by using such a small force, the force at which the tabs are contacting the sides of the slot can easily be overcome during removal of the measuring device. This also reduces the risk of potential damage to the edges of the folded box during the removal of the measuring device.

The present biasing arrangement also makes it possible to replace the know-how of the operator as the device is configured to perform reproducible measurements.

According to one embodiment, the biasing arrangement is in the form of a spring. An end of the spring is secured to the slide and another end of the spring is secured to the measuring part. The use of a biasing arrangement or a spring allows to apply a constant and regular force on each of the opposed edges of the slot, for instance of the corrugated folded box.

According to one embodiment, the measuring part is connected to a first base comprising the second tab, the first base comprising a bottom flat surface, and wherein the measuring part and the first base are configured to slide in unison along the slide.

With the bottom flat surface of the first base of the measuring part positioned against the upper surface of the product, the device is stable for placing the first and second surfaces of the first and second tabs against the respective edge of the slot and measuring the width of the slot.

In an embodiment, the first base and the measuring part are connected to each other by at least one fastener.

According to one embodiment, the first tab is fixed to the first base of the measuring part. The first tab is oriented downwardly relative to the bottom flat surface of the first base. The first tab is perpendicular to the bottom flat surface of the first base. The first tab with the first surface are perpendicular to the longitudinal axis of the slide.

According to one embodiment, the slide comprises a second base having a bottom flat surface. When the second base is being laid on an upper surface of the product, the upper surface being in immediate proximity of the second edge on the other side of the first edge. With the bottom flat surface of the second base of the slide positioned against the upper surface of the product, the device is stable for placing the first and second surfaces of the first and second tabs against the respective edge of the slot and measuring the width of the slot.

According to one embodiment, the second tab is fixed to the second base of the slide. The second tab is oriented downwardly relative to the bottom flat surface of the second base. The second tab is perpendicular to the bottom flat surface of the second base. The second tab with the second surface are perpendicular to the longitudinal axis of the slide.

According to one embodiment, the slide comprises a third base having a bottom flat surface. When the third base being laid on an upper surface of the product, the upper surface being spaced from the first edge. With the bottom flat surface of the third base of the slide positioned against the upper surface of the product, the device is stable for placing the first and second surfaces of the tabs against the respective edge and measuring the width of the slot. The third base is also useful for a better handling of the device.

According to an embodiment, the bottom flat surface of the first base and the bottom flat surface of the third base are positioned in the same plane, such that the bottom flat surfaces of the first base and the third base are both in contact with a flat surface of a folded box, and parallel to the surface of the folded box when positioned thereupon According to one embodiment, the first tab is divided in two segments separated by a recess, the first surface of the first tab being flush with the second surface of the second tab when the second tab is located in the recess. When the second tab is inside the recess between the two segments of the first tab, the operator may calibrate the device to the value "0", for instance by pushing on a knob to reset a digital display to "0".

According to one embodiment, the display is a digital display. The operator read easily the value of the width of the slot on the digital display once the first tab with the first surface and the second tab with the second surface are respectively put against the respective edge. In another category of measuring device, the display may be also with a scale engraved on the slide and a window opened in the measuring part and a Vernier engraved on the measuring part.

According to a second aspect of the present invention, a method for measuring a width between spaced apart opposed edges of a slot in a product comprises the steps of:
 providing a device such as described and claimed;
 calibrating the device to "0";
 positioning the device such that the first and second tabs enter into the slot, the first surface of the first tab contacts the first edge of the spaced apart opposed edges and the second surface of the second tab contacts the second edge of the spaced apart opposed edges;
 reading the value of the width of a slot displayed by the display.

According to one implementation of the method, the product is a folded box made of cardboard. The slot is formed between the first edge of a first panel and the second edge of a second panel of the folded box.

BRIEF DESCRIPTION OF THE DRAWINGS

Further advantages and features will become apparent from reading the description of the invention and from the appended figures, which show a non-limiting exemplary embodiment of the invention and in which.

DETAILED DESCRIPTION OF PREFERRED EMBODIMENTS

Figure 1:
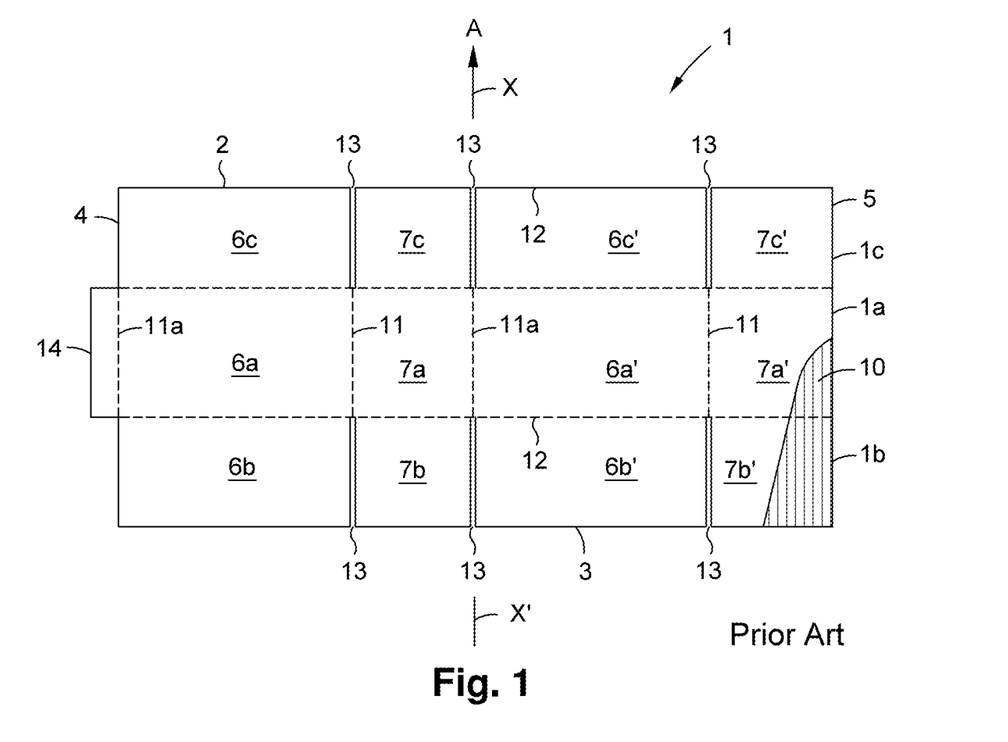
FIG. 1 is a plan view of a prior art cardboard blank.
Figure 2:
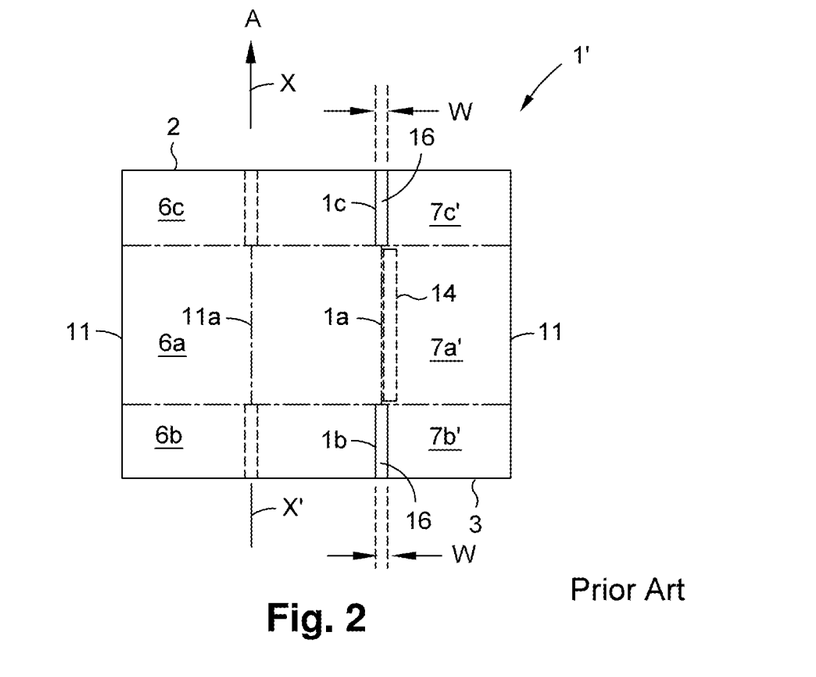
FIG. 2 is a top view of a prior art folded-glued box obtained from the blank shown in FIG. 1.
Figure 3:
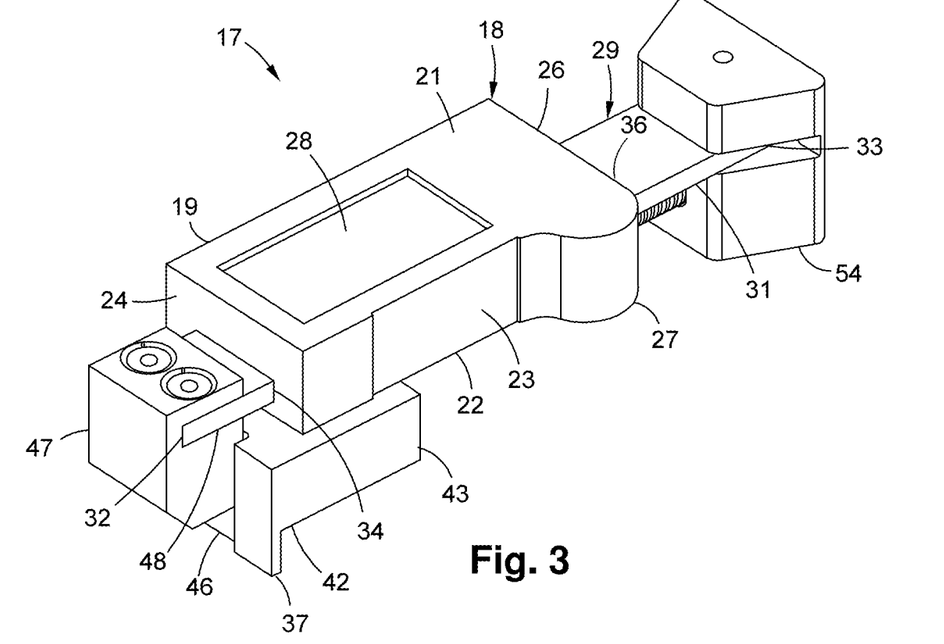
FIG. 3 is a perspective upper view of the measuring device according to the invention.

FIG. 1 shows a blank made of cardboard 1 which is used for manufacturing a folded box 1', such as the one shown on FIG. 2. The blank is intended to be fed at an inlet of a folding-gluing machine or of packaging machine for manufacturing foldable boxes comprising a folding-gluing unit. The blank 1 when flat presents generally a rectangular shape with two parallel edges of bigger length, forming the front edge 2 for the edge entering firstly in the folding-gluing unit (see arrow A and longitudinal axis XX') and the rear edge 3 for the edge entering lastly in the folding-gluing unit. The two lateral edges of smaller length define the left edge 4 and right edge 5 parallel to the longitudinal axis XX'. The left edge 4 presents cutouts along its two end portions so as to define a flap 14 in the middle of the left edge 4.

Front and rear creases 12 respectively parallel to the front and rear edges 2 and 3 define a central portion 1a of the blank 1 which is intended to constitute the peripheral face of the folded box 1'. The central portion 1a is placed between a rear portion 1b, which is intended to constitute the bottom face of the folded box 1', and a front portion 1c which is intended to constitute the upper face of the folded box 1'.

The blank 1 comprises further two pairs of creases 11 and 11a which are parallel to the right and left edges 5 and 4, as well as to the corrugations 10 of the corrugated layer of the cardboard. These creases 11 and 11a extend along the whole width of the central portion 1a. One of the creases 11a is adjacent to the flap 14, as the other of the creases 11a, called central crease, is aligned with the longitudinal axis XX'. One of the creases 11 is placed between the right edge 5 and the central crease 11a, as the other crease 11 is placed between the left edge 4 and the central crease 11a. The distance separating the latter crease 11 from the central crease 11a equals the distance of the first crease 11 with the right edge 4.

In line with creases 11 and central crease 11a, the rear and front portions 1b and 1c are cut so as to create slits 13 extending on the whole width of the rear and front portions 1b and 1c. Slits 13 define thus respectively two pairs of panels in each of the rear and front portions 1b and 1c, respectively a first pair of large rear panels 6b and 6b', a second pair of large front panels 6c and 6c', a first pair of small rear panels 7b and 7b' and a second pair of small front panels 7c and 7c'. The large rear and front panels 6b, 6c and 6b', 6c' are located respectively on each side of a large central panel 6a et 6a'. In a similar manner small rear and front panels 7b, 7c and 7b', 7c' are located respectively on each side of a small central panel 7a et 7a'.

Creases 11 and 11a and their slits 13 enable to fold the blank 1 to a folded box 1' with a rectangular shape, each crease 11 defining a folding line (FIG. 2). The folded box 1' is obtained by folding at 180° to the inside of the blank 1 and about creasing lines 11 of a first ensemble formed by the left panels 6a, 6b and 6c and a second ensemble formed by the right panels 7a', 7b' and 7c'. The large left central panel 6a with the large front panel 6c and large rear panel 6b is folded at 180° with respect to the left crease 11, and the small right central panel 7a' with the small front panel 7c' and the small rear panel 7b' is folded at 180° with respect to the right crease 11. Simultaneously during the folding process, glue is sprayed on the flap 14 and the large left central panel 6a is thus joined to the small right central panel 7a'.

Once folded (see FIG. 2) the two neighboring large rear left panel 6b and small rear right panel 7b' are separated by a rear slot 16, and the two neighboring large front left panel 6c and small front left panel 7c' are separated by a front slot 16. The respective left and right edges of the slots 16 are created by the left edge 4 and the right edge 5 of the blank 1 which are now neighboring for the folded box 1'. The rear slot 16 extends from the rear crease 12 and flap 14 to the rear edge 3 and the front slot 16 extends from the front crease 12 and flap 14 to the front edge 2. When the folded box 1' is correctly folded, the value for width W of both slots 16 is generally constant and corresponds to a predetermined standard of quality, and the value for width W of the rear slot 16 equals the value for width W of the front slot 16. When the folded box 1' is to be rejected as being defective, the width W is too large, or at the opposite too narrow, or the slots 16 have oblique edges, instead of edges being parallel to one another.

A measuring device 17 according to the invention (see FIGS. 3-7) enables the operator to obtain a value for the width W and to determine whether the quality of the folded box 1' is sufficient.

The device 17 comprises a measuring part 18 in the form of a main body 19. The body 19 presents a globally quadrangular/rectangular shape with an upper face 21, a lower face 22, two flat vertical longitudinal sides 23 and two flat vertical transversal sides 24 and 26. A projection 27 having a half-cylindrical shape extends from one of the flat longitudinal vertical sides 23 of the body 19. The projection 27 is for enhancing the ergonomic quality of the device 17, the operator placing one of his fingers at the rear of the projection 27.

A measuring detector (not visible) is inserted inside the body 19. A display 28 (shown in FIGS. 3 and 5) is arranged on the upper face 21 of the body 19 so as to be clearly visible by the operator. In one embodiment when the measuring detector is of the electronic type, the display 28 may be a digital display, for instance with a rectangular LCD screen, connected to the detector. The value W measured by the device 17 is displayed by the LCD of the display 28.

The device 17 comprises a slide 29 in the form of a rule 31. The rule 31 is made with an elongated flat metal strip having a first proximal end 32 and a second distal end 33. The slide 29 and thus the rule 31 defines a longitudinal axis X. The body 19 comprises an elongated internal housing (not visible) that opens with two proximal and distal slots 34 and 36 arranged respectively on the proximal flat vertical transversal side 24 and distal flat vertical transversal side 26. The rule 31 is inserted in and extends across the internal housing of the body 19, the proximal end 32 exiting from the first proximal slot 34 and the distal end 33 exiting from the second distal slot 36.

The slots 34, 36 can be in the form of apertures and are arranged respectively on the proximal flat vertical transversal side 24 and distal flat vertical transversal side 26 of the body 19. In such a way, a traversing channel is formed in the body 19 and extends between a proximal aperture 34 and a distal aperture 36.

The slide 28 slides (arrows E and R in FIGS. 3, 5 and 7) along the longitudinal axis X with respect to the measuring part 18. The measuring detector detects the amount of displacement of the slide 28 with respect to the measuring part 18 as for a caliper.

According to the invention, the measuring part 18 comprises a first tab 37 placed at the level of the proximal flat vertical transversal side 24. The first tab 37 is oriented downwardly relative to the measuring part 18, i.e. relative to the body 19 and to the lower face 22 of the body 19. This means that during a measurement the display 28 is oriented upwardly and the first tab 37 is oriented downwardly at the opposite of the display 28.

The first tab 37 is oriented to be perpendicular to a plane of the measuring part 18, i.e. to the body 19 and to the lower face 22 of the body 19. The first tab 37 is oriented to be perpendicular to the longitudinal axis X of the slide 28. The first tab 37 is parallel to the proximal flat vertical transversal side 24 of the body 19. The first tab 37 is divided in two small tabs 38 and 39, the small tabs 38 and 39 being separated by a recess 41. The first tab 37 is placed at a proximal end 42 of a quadrangular first element or base 43 attached to the lower face 22 at the proximal flat vertical transversal side 24 of the body 19.

The first tab 37 is configured to enter into the slot 16 of the folded box 1'. The first tab 37 presents a first contact surface 44. The first contact surface 44 is oriented toward the distal end 33 of the rule 31 of the slide 29. As a consequence of the division of the first tab 37 into small tabs 38 and 39, the first contact surface 44 is divided in two smaller surfaces. The first contact surface 44 is able to come and abut against the first edge, being one of the edges 4 or 5, in this case the left edge 4 of the slot 16 in the folded box 1' (see FIG. 7).

According to the invention, the slide 29 comprises a second tab 46 placed at the level of the first proximal end 32 of the rule 31. The second tab 46 is oriented downwardly relative to the measuring part 18, i.e. relative to the body 19, to the lower face 22 of the body 19 and to the flat rule 31. This means that during a measurement the display 28 is oriented upwardly and the second tab 46 is oriented downwardly at the opposite of the display 28.

The second tab 46 is oriented to be perpendicular to a plane of the measuring part 18 and of the slide 29, i.e. to plane of the body 19, to the lower face 22 of the body 19 and to the plane of the flat rule 31. The second tab 46 is oriented to be perpendicular to the longitudinal axis X of the slide 28. The second tab 46 is parallel to the proximal flat vertical transversal side 24 of the body 19. The second tab 46 is also parallel to the first tab 37. The second tab 46 is placed at the level of a second element or base 47 attached to the lower face 48 at the first proximal end 32 of the rule 31.

The second tab 46 is configured to enter into the slot 16 of the folded box 1'. The second tab 46 presents a second contact surface 49. The second contact surface 49 is oriented toward the proximal end 32 of the rule 31 of the slide 29. The recess 41 of the first tab 37 is dimensioned so as to be slightly larger than the second tab 46. The second tab 46 is configured to enter into the recess 41. When the second tab 46 is inside the recess 41, the first contact surface 44 of the first tab 37 is flush with the second contact surface 49 of the second tab 46. The second contact surface 49 is able to come and abut against the second edge, the other of both edges 4 or 5, in this case the right edge 5 of the slot 16 in the folded box 1' (see FIG. 7).

To ensure the quality of the measure and with having a stable device 17, the first base 43 of the measuring part 18 presents a bottom flat surface 51. When the operator takes the measure, the bottom flat surface 51 is laid on the upper surface of the large rear panel 6b (or front left panel 6c) of the folded box 1' in immediate proximity of the left edge 4 (see FIG. 7). The first base 43 and the measuring part 18 may be connected to each other by at least one fastener 60.

To ensure the quality of the measure with having a more stable device 17, the second base 47 of the slide 29 presents a bottom flat surface 52. When the operator takes the measure, the bottom flat surface 52 is laid on the upper surface of the small rear panel 7b' (or small front panel 7c') of the folded box 1' in immediate proximity of the right edge 5 (see FIG. 7).

To ensure the quality of the measure with having a still more stable device 17, the slide 29 comprises a third element or base 53 attached to the lower face 48 at the second distal end 33 of the rule 31. The third base 53 of the slide 29 presents a bottom flat surface 54. When the operator takes the measure, the bottom flat surface 54 is laid on the upper surface of the large rear panel 6b (or front left panel 6c) of the folded box 1' spaced from the left edge 4 (see FIG. 7). The third base 53 comprises also an upper part attached to the upper face at the second distal end 33 of the rule 31. The third base 53 enhances the ergonomics of the measuring device 17 by being placed inside the palm of the hand of the operator.

Figure 4:
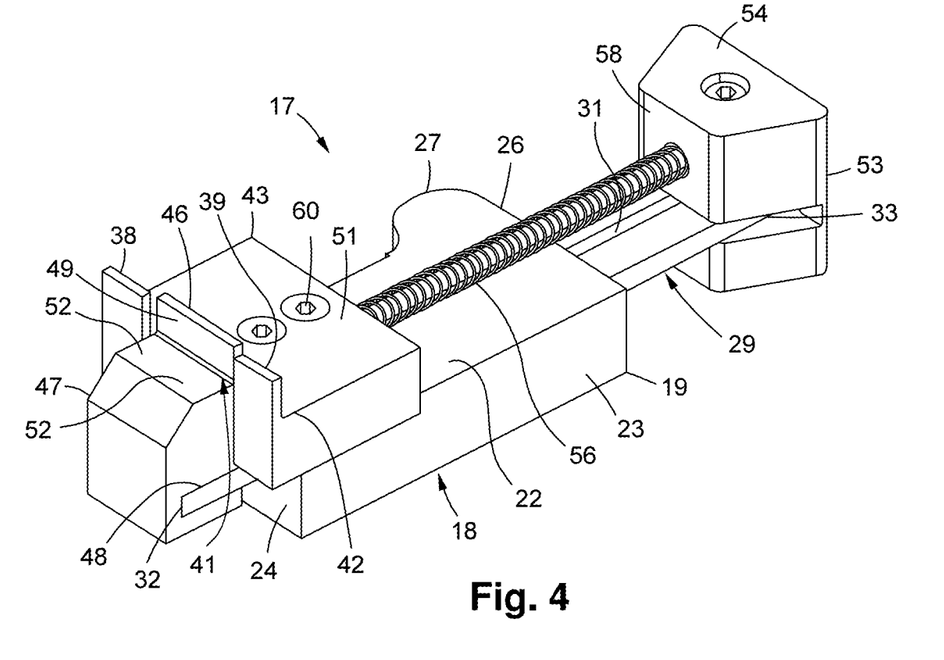
FIG. 4 is a perspective bottom view of the measuring device of FIG. 3.
Figure 5:
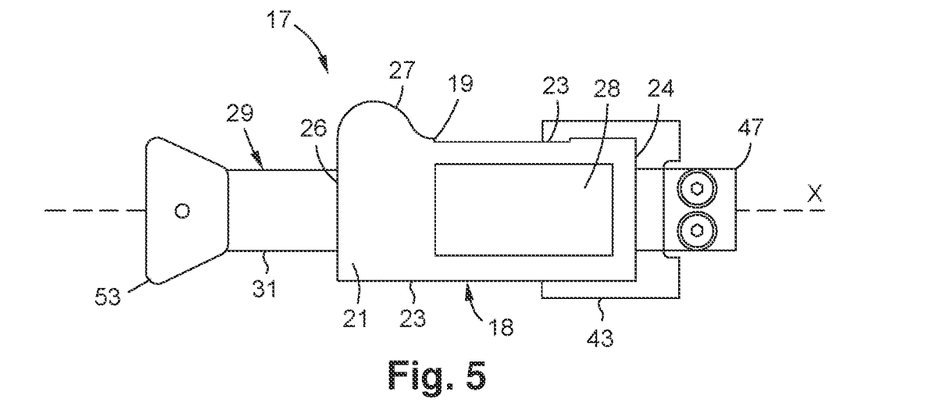
FIG. 5 is a top view of the of the measuring device of FIG. 3.
Figure 6:
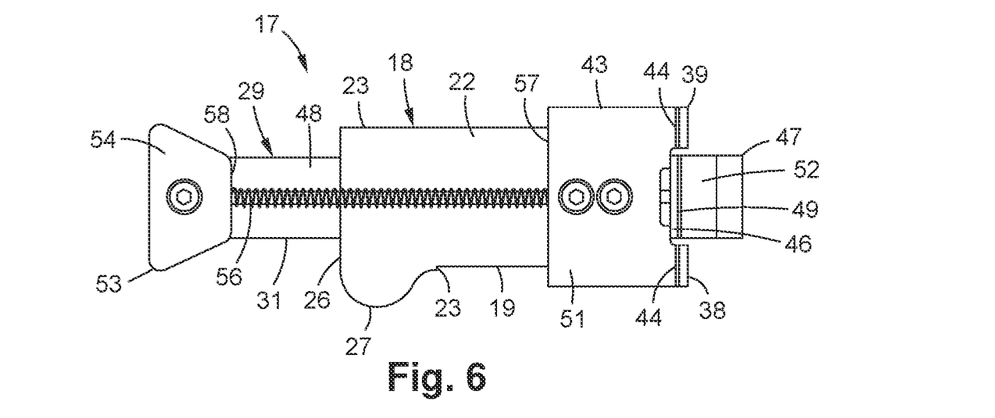
FIG. 6 is a bottom view of the measuring device of FIG. 3.
Figure 7:
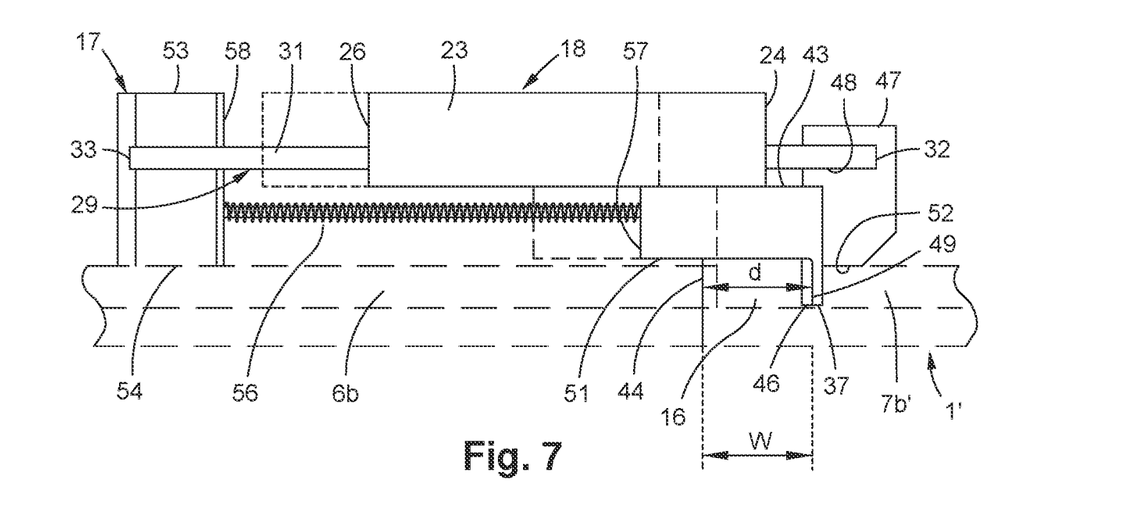
FIG. 7 is a lateral view of the measuring device of FIG. 3 in a calibrating position and in a measuring position.

To ensure a correct positioning of the first and second tabs 37 and 46 and an abutment of the first surface 44 with the two smaller surfaces of the first tab 37 against the left edge 4 of the slot 16 and of the second surface 49 of the second tab 46 against the right edge 5 of the slot 16, the measuring device 17 comprises a biasing arrangement 56 (see FIGS. 4, 6 and 7). The biasing arrangement 56 is configured to exert a constant force spreading the first tab 37 from the second tab 46. The biasing arrangement 56 is provided between the slide 29 and the measuring part 18.

The biasing arrangement 56 is advantageously in the form of a spring. The spring is mounted with its proximal end attached to the distal flat vertical transversal side 57 of the first base 43 and its distal end attached to the proximal flat vertical transversal side 58 of third base 53.

According to a second aspect of the invention, a method for measuring the width W between spaced apart opposed first edge 4 and second edge 5 of the slot 16 in the folded box 1', comprising the two following first steps of providing the device 17, and calibrating the device 17 to have the display showing the value "0". If needed, the operator pushes on a knob (not shown). The calibration is obtained when the operator places the second tab 46 inside the recess 41 between the two small parts 38 and 39 of the first tab 37. The insertion of second tab 46 inside the recess 41 is performed against the strength of the spring 56. The first contact surface 44 of the first tab 37 is flush with the second contact surface 49 of the second tab 46, the distance d between the first contact surface 44 and the second contact surface 49 equals to "0".

The method comprises then the two further following steps of positioning the device 17 such that the first tab 37 and second tabs 46 enter into the slot 16 (see dotted lines in FIG. 7), and reading the value of the width W displayed by the display 28. Once the operator has correctly inserted the device 17 with the first and second tabs 37 and 46 being into the slot 16, he then releases the spring 56, and the slide 29 automatically slides and adjusts relative to the measuring part 18. The first surface 44 of the first tab 37 contacts the first left edge 4 of the spaced apart opposed edges and simultaneously the second surface 49 of the second tab 46 contacts the second edge 5 of the spaced apart opposed edges of the slot 16. The distance d between the first contact surface 44 and the second contact surface 49 corresponds to the width W of the slot 16. The stabilized value for the width W appears on the digital display 28 and the operator could read it.

The present invention is not limited to the embodiments described and illustrated. Numerous modifications can be made without otherwise departing from the scope defined by the set of claims.

The invention claimed is:

1. A measuring device for measuring a width between a first edge and a second edge of spaced apart opposed edges of a slot in a product, the measuring device comprising:
    a measuring part, comprising a measuring detector and a display, and wherein the measuring part is provided with a first tab configured to enter into the slot, and
    a slide, defining a longitudinal axis and being arranged so as to be adjustable relative to the measuring part along the longitudinal axis, and provided with a second tab being configured to enter into the slot,
    the slide being adjustable so that a first surface of the first tab contacts the first edge and a second surface of the second tab contacts the second edge, and wherein a distance between the first surface and the second surface corresponding to the width is detectable by the measuring detector, and the value of the width being displayed by the display,
    wherein the first and second tabs have an extension such that they are oriented downwardly relative to the display of the measuring part, and perpendicular or transverse to the longitudinal axis of the slide,
    the measuring part is connected to a first base, the first base comprising a first bottom flat surface configured to be positioned upon a first flat surface of a folded box,
    the measuring part and the first base are configured to slide in unison along the slide,
    the slide comprises a second base having a second bottom flat surface configured to be positioned upon a second flat surface of the folded box, and
    the second flat surface of the folded box is opposite the slot from the first flat surface of the folded box.

2. The measuring device according to claim 1, wherein the slide extends through a proximal aperture and a distal aperture in the measuring part, such to enable an adjustable movement of the measuring part relative to the slide along the longitudinal axis.

3. The measuring device according to claim 1, wherein the first base comprises the first tab.

4. The measuring device according to claim 1, wherein the first base and the measuring part are connected to each other by at least one fastener.

5. The measuring device according to claim 1, wherein the second tab is fixed to the second base.

6. The measuring device according to claim 1, wherein the first tab is divided in two tabs separated by a recess, the first surface of the first tab being flush with the second surface of the second tab when the second tab is located in the recess.

7. The measuring device according to claim 1, wherein the display is a digital display.

8. The measuring device according to claim 1, further comprising a biasing arrangement arranged between the slide and the measuring part, and configured to exert a force spreading the first tab from the second tab, and wherein said force is selected in a range of 0.03 to 0.10 N/mm.

9. The measuring device according to claim 8, wherein the biasing arrangement is in the form of a spring.

10. The measuring device according to claim 1, wherein the slide comprises a third base having third bottom flat surface.

11. The measuring device according to claim 10, wherein the first bottom flat surface of the first base and the third bottom flat surface of the third base are positioned in the same plane, such that the bottom flat surfaces of the first base and the third base are both in contact with a flat surface of a folded box, and parallel to the surface of the folded box when positioned thereupon.

12. A method for measuring a width between spaced apart opposed edges of a slot in a product, the method comprising:
    providing the measuring device according to claim 1;
    calibrating the measuring device to "0";
    positioning the measuring device such that the first and second tabs enter into the slot, the first surface of the first tab contacts the first edge and the second surface of the second tab contacts the second edge of the spaced apart opposed edges; and
    reading the value of the width displayed by the display.

13. The method according to claim 12, wherein the product is a folded box made of cardboard, the slot being formed between the first edge of a first panel and the second edge of a second panel.

14. The measuring device according to claim 1, further comprising a biasing arrangement arranged between the slide and the measuring part, and configured to exert a force spreading the first tab from the second tab.

15. The measuring device according to claim 14, wherein said force is selected in a range of 0.04 and 0.07 N/mm.

16. A measuring device for measuring a width between a first edge and a second edge of spaced apart opposed edges of a slot in a product, the measuring device comprising:
    a measuring part, comprising a measuring detector and a display;
    a slide, defining a longitudinal axis and being arranged so as to be adjustable relative to the measuring part along the longitudinal axis;
    a first base connected to the measuring part, the first base including a first tab configured to be positioned within the slot, and a first bottom surface configured to be positioned on a first surface of the product;
    a second base connected to a proximal end of the slide, the second base including a second tab configured to be positioned within the slot and a second bottom surface configured to be positioned on a second surface of the product;
    a third base connected to a distal end of the slide, the third base including a third bottom surface configured to be positioned on the first surface of the product;
    wherein, the first base and the connected measuring part move relative to the slide so as to cause relative movement between the first tab and the second tab,
    a distance between a first surface of the first tab and a second surface of the second tab is detectable by the measuring detector;
    the first bottom surface is positioned on an opposite side of the slot from the second bottom surface; and the first base and the connected measuring part slide between the second base and the third base.

* * * * *

UNITED STATES PATENT AND TRADEMARK OFFICE
CERTIFICATE OF CORRECTION

| | | |
|---|---|---|
| PATENT NO. | : 12,174,012 B2 | Page 1 of 1 |
| APPLICATION NO. | : 17/753573 | |
| DATED | : December 24, 2024 | |
| INVENTOR(S) | : Maxime Brenaut et al. | |

It is certified that error appears in the above-identified patent and that said Letters Patent is hereby corrected as shown below:

In the Claims

In Claim 6, Column 9, Line 65:
After "two" insert --small--.

In Claim 10, Column 10, Line 11:
After "having" insert --a--.

Signed and Sealed this
Second Day of September, 2025

Coke Morgan Stewart
*Acting Director of the United States Patent and Trademark Office*